UNITED STATES PATENT OFFICE.

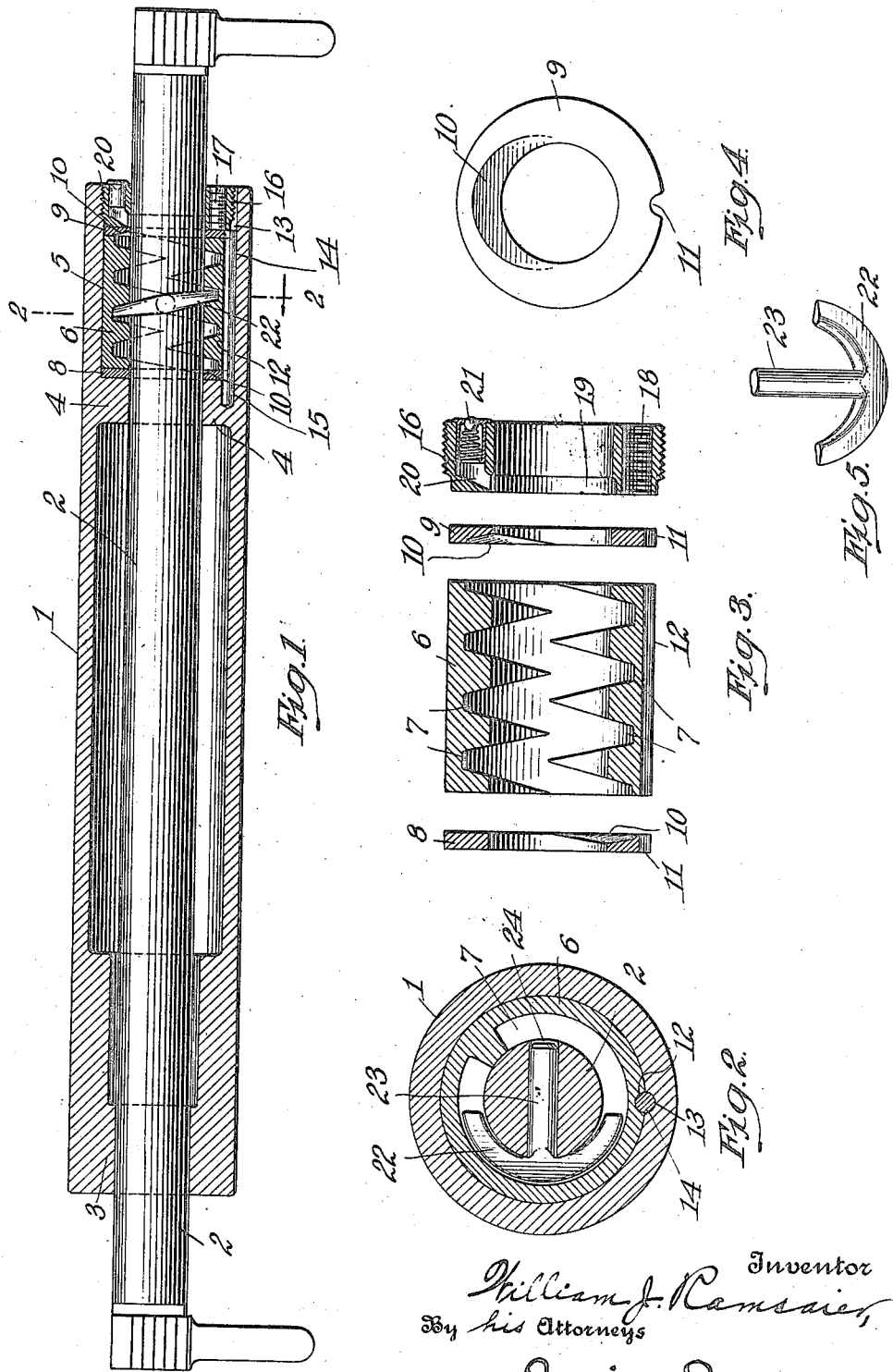

WILLIAM J. RAMSAIER, OF NEW YORK, N. Y.

INK-DISTRIBUTER.

1,239,129.   Specification of Letters Patent.   Patented Sept. 4, 1917.

Application filed March 23, 1917. Serial No. 156,829.

*To all whom it may concern:*

Be it known that I, WILLIAM J. RAMSAIER, a citizen of the United States, and resident of the borough of Manhattan, city, county, and State of New York, have invented certain new and useful Improvements in Ink-Distributers, of which the following is a specification.

This invention relates to improvements in ink-distributing rolls or drums for printing presses, planographic machines, and the like.

One of the objects of the invention is to provide a sleeve adapted to fit within the interior of the changer roll or distributing drum and having a duplex thread on its inner surface in which a crescent-shaped switch carried by the roller or drum supporting shaft operates to impart a reciprocating motion to the roll or drum upon the shaft when the roll or drum is rotated about the shaft.

Another object of the invention, is to provide simple and strong mechanism for reciprocating the distributing roll which may be readily connected with the roll and its shaft, and may be readily detached therefrom for the purpose of renewing or repairing worn or broken parts.

Another object of the invention is to provide reciprocating mechanism for ink distributing rolls or drums adapted to be mounted within one end of the roll or drum and operatively connected thereto without the employment of screws, bolts, or other fastening means passing through the outer surface of the roll or drum.

In the drawings, Figure 1 is a longitudinal sectional view, showing one form of distributer roll embodying the invention;

Fig. 2 a transverse sectional view on the line II—II of Fig. 1;

Fig. 3 a detail longitudinal sectional view, showing the threaded sleeve and associated parts;

Fig. 4 a detail front elevation of one of the washers; and

Fig. 5 a detail perspective view of the crescent switch.

Referring to the parts by numerals, 1 designates the ink distributing roll or drum which is loosely mounted on the shaft 2. The shaft 2 may be supported in the press frame in any suitable manner and may be held against rotation by any suitable means, such, for instance, as that shown in my co-pending application Serial No. 109,821, filed July 17, 1916, and allowed February 14, 1917. The roll 1 is provided at one end with a suitable bearing 3 for the shaft 2 and is provided with a bearing 4 for the shaft at a suitable distance from its opposite end.

The roll 1 is formed with a cylindrical chamber 5 extending from the bearing 4 to the adjacent end of the roll. A sleeve 6, having an internal duplex thread 7, fits snugly within the chamber 5 and about the shaft 2. A washer 8 is preferably interposed between the inner end of the sleeve 6 and the adjacent face of the annular bearing flange 4, and a similar washer 9 abuts against the opposite end of the sleeve. The faces of the washers 8 and 9 adjacent the ends of the sleeve are formed with suitable recesses 10, forming the ends of the duplex thread on the sleeve, to assist in reversing the crescent switch.

The washers 8 and 9 are provided with notches 11 adapted to register with complementary grooves 12 and 13 formed, respectively, in the outer surface of the sleeve 6 and the inner wall of the chamber 5. The sleeve and washers are locked to the roll 1, to rotate therewith, by means of a pin 14 extending through the grooves 12 and 13 in the sleeve and roll and the registering notches 11 in the washers. The inner end of the pin 14 preferably extends into a recess 15 in the bearing flange 4 to assist in firmly locking the parts together.

The sleeve and washers are held within the chamber 5 by means of a nut 16, threaded into the outer end of the roll. The inner face of the nut 16 is adapted to engage the washer 9 so as to force the sleeve and washers inwardly against the bearing flange 4 and hold said parts against longitudinal movement. A suitable locking screw 17 may be threaded through an aperture 18 in the nut 16 so as to bear against the washer 9 and lock the nut against rotation. The nut 16 is also preferably formed with an annular recess 19 extending around the shaft 2 to form an oil-distributing chamber for supplying lubricating oil to the shaft and roll-reciprocating mechanism. Oil is supplied to the chamber 19 through an opening 20 closed by a spring-pressed ball-valve 21.

The distributer roll or drum may be driven by frictional contact with the inking roll, or by means of suitable gearing, or in any other manner, to cause the roll to rotate about the shaft 2. To cause the roll to reciprocate longitudinally when rotated about the shaft 2, a crescent switch 22 is pivotally mounted on the shaft, the crescent portion thereof fitting and operating in the duplex thread 7 on the sleeve 6. The stem or pivot pin 23 of the crescent switch fits in an aperture 24 in the shaft 2. The wings of the crescent switch are shaped to provide a slight clearance between the inner edges thereof and the shaft 2, and the inner edges of the wings are preferably rounded as shown more clearly in Fig. 5. The clearance between the wings of the crescent and the shaft preferably gradually increases from the stem toward the ends of the wings, as shown in Fig. 2.

From the foregoing it will be seen that an ink distributer comprising a roll or drum adapted to be rotated about a supporting shaft, and reciprocated longitudinally upon the shaft, has been provided; that the means for imparting the reciprocatory motion to the roll or drum comprises a few strong and simply constructed parts which may be readily assembled and removed for purposes of repair or renewal; and that the roll-reciprocating mechanism is adapted to be mounted entirely within the interior of the roll or drum without the employment of fastening means extending through the periphery of the roll.

What I claim is:

1. In a device of the class described, the combination of a shaft, a crescent switch having a bearing in said shaft, an ink-distributing roll revolubly and slidably mounted on said shaft and formed with a chamber at one end, a sleeve fitting in said chamber and surrounding the shaft, said sleeve being provided with an internal duplex thread in which said crescent switch operates, means engaging complementary grooves in said sleeve and the inner wall of said chamber for locking the sleeve to the roll to rotate therewith, and means for confining the sleeve within said chamber.

2. A device of the class described, comprising a shaft, a distributer drum revolubly and slidably mounted on said shaft, a sleeve fitting within said drum and formed with an internal duplex thread, a crescent switch pivotally mounted on the shaft and adapted to operate in said duplex thread, means for locking the sleeve to the drum to rotate therewith, and means for preventing relative longitudinal movement between the sleeve and drum.

3. A device of the class described, comprising a shaft, a distributer drum revolubly and slidably mounted on said shaft, a sleeve fitting within said drum and formed with an internal duplex thread, a crescent switch pivotally mounted on the shaft and adapted to operate in said duplex thread, said drum and sleeve being provided with complementary key-ways, a pin in said key-ways for locking the sleeve to the drum to rotate therewith, and means for preventing relative longitudinal movement between the sleeve and drum.

4. In a device of the class set forth, the combination of a shaft, a distributer roll slidably and revolubly mounted on said shaft, a sleeve fitting within the roll and formed with an internal duplex thread, a crescent switch pivotally mounted on the shaft and adapted to operate in said thread, means carried within said roll engaging said sleeve to lock the sleeve to the roll to rotate therewith, and means for preventing relative longitudinal movement between the sleeve and roll.

5. A device of the class set forth, comprising a shaft, a distributing roll slidably and revolubly mounted on said shaft and formed with a chamber at one end, a sleeve fitting within said chamber and provided with an internal duplex thread, means carried by said roll for locking the sleeve to the roll to rotate therewith, means for confining the sleeve within the chamber, and a crescent switch carried by said shaft and engaging in the duplex thread on said sleeve.

6. In a device of the class set forth, the combination of a shaft, a distributing roll slidably and rotatably mounted on said shaft and formed with a chamber at one end, a sleeve fitting within said chamber and having an internal duplex thread, a washer interposed between the end wall of said chamber and the inner end of said sleeve, a closure ring threaded into the outer end of said chamber, a washer interposed between said closure ring and the outer end of the sleeve, means for locking said sleeve and washers to the roll to rotate therewith, and a crescent switch pivotally mounted on said shaft and engaging in the duplex thread on said sleeve.

7. In a device of the class set forth, the combination of a shaft, an ink-distributing roll slidably and rotatably mounted on said shaft and formed with a chamber at one end, a sleeve fitting within said chamber and formed with an internal duplex thread, thrust rings at opposite ends of said sleeve closing the ends of the duplex thread, means carried within the roll for locking the sleeve and thrust rings to the roll to rotate therewith, means for confining the sleeve and thrust rings within said chamber, and a crescent switch mounted on said shaft and operating in the duplex thread on said sleeve.

8. In a device of the class set forth, the combination of a shaft, an ink-distributing roll slidably and rotatably mounted on said shaft and formed with a chamber at one end, a sleeve fitting within said chamber and formed with an internal duplex thread, thrust rings at opposite ends of said sleeve closing the ends of the duplex thread, a key carried by said roll and engaging in registering longitudinally extending key-ways in the sleeve and thrust rings, means for confining the sleeve and thrust rings within said chamber, and a crescent switch pivotally connected with said shaft and engaging in the duplex thread on said sleeve.

9. In a device of the class set forth, the combination of a shaft, an ink-distributing roll slidably and rotatably mounted on said shaft and formed with a chamber at one end, a sleeve fitting within said chamber and formed with an internal duplex thread, thrust rings at opposite ends of said sleeve closing the ends of the duplex thread, a key carried by said roll and engaging in longitudinally extending key-ways in the sleeve and thrust rings, a closure ring threaded into the outer end of said chamber, and a crescent switch pivotally connected with said shaft and engaging in the duplex thread on said sleeve.

10. In a device of the class set forth, the combination of a shaft, an ink-distributing roll slidably and rotatably mounted on said shaft and formed with a chamber at one end, a sleeve fitting within said chamber and formed with an internal duplex thread, thrust rings abutting against the opposite ends of said sleeve and provided with recesses in their inner faces forming the ends of the duplex thread, means for locking the sleeve and thrust rings to the roll to rotate therewith, means for confining the sleeve and thrust rings within said chamber, and a crescent switch mounted on the shaft and operating in the duplex thread.

11. A device of the class described comprising a shaft, a roll rotatably mounted on said shaft, a sleeve rigidly secured to said roll to rotate therewith and formed with an internal duplex thread, a crescent switch mounted on the shaft and adapted to travel in the duplex thread of the said sleeve, and means at the ends of said sleeve for turning said switch to divert it from one thread into the other thread, whereby the roll will be reciprocated longitudinally during its rotation.

12. A device of the class described comprising a shaft, a roll rotatably mounted on said shaft, a sleeve rigidly secured to said roll to rotate therewith and formed with an internal duplex thread, a crescent switch mounted on the shaft and adapted to travel in the duplex thread of the said sleeve, a thrust device at one end of the sleeve adapted to turn the switch to divert it from one thread into the other thread, whereby the roll will be reciprocated longtudinally during its rotation.

13. A device of the class described comprising a shaft, a roll rotatably mounted on said shaft, a sleeve rigidly secured to said roll to rotate therewith and formed with an internal duplex thread, a crescent switch mounted on the shaft and adapted to travel in the duplex thread of the said sleeve, a thrust device at each end of the sleeve adapted to turn the switch to divert it from one thread into the other thread, whereby the roll will be reciprocated longitudinally during its rotation.

14. A device of the class described, comprising a shaft, a distributer drum mounted on said shaft to rotate about the shaft and reciprocate longitudinally thereof, a sleeve formed with an internal duplex thread operatively connected to rotate with said drum, a crescent switch mounted on the shaft and adapted to travel in the duplex thread on said sleeve, means at the ends of said sleeve for reversing the crescent switch, and means connecting the sleeve and drum to reciprocate in unison upon said shaft.

15. A changer comprising a changer shaft, a changer roll rotatably mounted on said shaft and formed with a chamber at one end, a sleeve rigidly secured in said chamber and rotating with the changer roll and formed with an internal duplex thread, a closure ring at one end of said sleeve, and a crescent switch on the shaft and operating in the duplex thread.

In testimony whereof I hereunto affix my signature.

WILLIAM J. RAMSAIER.